United States Patent

[11] 3,604,988

[72] Inventors Dawon Kahng
Bridgewater Township, Somerset County;
Edward H. Nicollian, Murray Hill, both of, N.J.
[21] Appl. No. 863,663
[22] Filed Oct. 3, 1969
[45] Patented Sept. 14, 1971
[73] Assignee Bell Telephone Laboratories Incorporated
Murray Hill, N.J.

[54] SEMICONDUCTOR MEMORY APPARATUS WITH A MULTILAYER INSULATOR CONTACTING THE SEMICONDUCTOR
5 Claims, 2 Drawing Figs.

[52] U.S. Cl. .......... 317/235 R, 317/235 B, 317/235 AG
[51] Int. Cl. .......... H01l 11/14
[50] Field of Search .......... 317/235

[56] References Cited

UNITED STATES PATENTS

| | | | |
|---|---|---|---|
| 3,258,663 | 6/1966 | Weimer | 317/235 |
| 3,355,637 | 11/1967 | Johnson | 317/235 |

OTHER REFERENCES

Applied Physics Letters, "Evidence of Hole Injection and Trapping in Silicon Nitride Films Prepared by Reactive Sputtering" by Hu et al. Vol. 10, No. 3, 1 Feb. 67 pages 97–99

Applied Physics Letters, " Charge Storage Model For Variable Threshold Fet Memory Device" by Sewell et al. Vol. 14 No. 2 pages 45–47

Journal Of Applied Physics, " Charge Transport and Storage in Metal-Nitride-Oxide-Silicon (MNOS) Structures" by Bentchkowsky et al., Vol. 40, No. 8 July 1969, pages 3307–3311

*Primary Examiner*—Jerry D. Craig
*Attorneys*—R. J. Guenther and Arthur J. Torsiglieri

ABSTRACT: An electronic memory apparatus is disclosed in which the memory element is an insulated gate field effect transistor (IGFET) whose gate contains a metal electrode located on top of two parallel layered insulators, such as silicon oxide and zinc sulfide. The memory of a signal voltage applied to the gate electrode is provided by the phenomenon of tunneling of electrical charges between the metal electrode and the interface between the two insulator layers. These charges are trapped at this interface until a voltage of opposite sign is applied which is sufficient to discharge ("erase") the trapped charges at the interface. Nondestructive readout of the presence or absence of these trapped charges is afforded by monitoring the source-drain current in the transistor.

Figure 1:
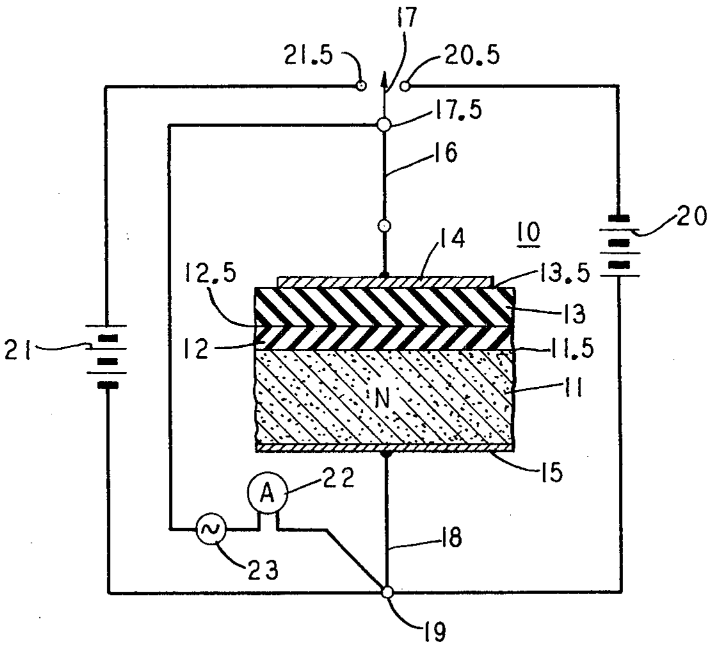

INVENTORS D. KAHNG
E. H. NICOLLIAN
BY D Caplan
ATTORNEY

SEMICONDUCTOR MEMORY APPARATUS WITH A MULTILAYER INSULATOR CONTACTING THE SEMICONDUCTOR

FIELD OF THE INVENTION

This invention relates to semiconductor apparatus which is characterized by a memory.

BACKGROUND OF THE INVENTION

In computers and electronic communication systems, there is a need for an electronic memory apparatus which can store a bit of binary input information. For example, in U.S. Pat. applications Ser. Nos. 643,658 now U.S. Pat. No. 3,543,052 and 643,659 now U.S. Pat. No. 3,500,142 filed on June 5, 1967 by one of the present inventors, there are described several types of semiconductor apparatus capable of performing such a memory function. In these apparatus, a signal voltage is applied to the memory element furnished by the gate electrode of a rather complicated insulated gate in a field effect transistor (IGFET). The presence of this signal voltage, or the absence thereof, can be read out by monitoring the source-drain electrical current at any time thereafter. However, the gate of these IGFET memory elements contains an intermediate metal layer, which tends to limit the memory span time due to leakage currents in this metal. Moreover, these memory elements, as well as others in the prior art (see: 42 Electronics, page 39, Apr. 28, 1969; and 30 RCA Rev. 335 ), suffer from noise due to time-varying concentrations of interface states at the surface between the semiconductor in the transistor and the insulator layer of the gate. It is well known in the art that these interface states degrade the performance of the memory elements, because a gate voltage induces a source-drain conductance whose magnitude depends in part on the concentration of the interface states. Therefore, the type of operation which depends upon tunneling of electrical charge carriers from the semiconductor through the insulator is undesirable, because the concentration of the interface states is altered by the tunneling process across this interface during operation. Thus, it would be desirable to have a memory structure which avoids this problem of alteration of the concentration of interface states at the semiconductor-insulator interface during operation.

SUMMARY OF THE INVENTION

The semiconductor memory apparatus of this invention includes an electrical circuit containing an $SI_1I_2M$ layered structure memory element, where S denotes semiconductor, $I_1$ and $I_2$ denote first and second insulators, and where M denotes metal. The first insulator layer $I_1$ is located in physical contact with a major surface of the semiconductor, and the second insulator layer $I_2$ is sandwiched between the first insulator layer and the metal electrode. It is important in this invention that the tunneling probability of charge carriers from the semiconductor through the first insulator to the interface between the first and second insulator layers be at least an order of magnitude less than the tunneling probability of charge carriers from the metal electrode through the second insulator to this same interface. In practice, this usually means that the energy barrier height between the semiconductor and the first insulator be larger than the energy barrier height between the metal electrode and the second insulator layer (i.e., assuming equal effective mass of charge carriers in the first insulator as compared with the second insulator). Typical examples of suitable insulator materials for the first insulator layer are silicon oxide, zirconium oxide, and aluminum oxide ($SiO_2$, $ZiO_2$, and $Al_2O_3$ ); and typical examples of insulator materials for the second insulator layer are zinc sulfide, gallium arsenide, and gallium phosphide (ZnS, GaAs, and GaP). By reason of the fact that negligible tunneling occurs through the first insulator, the problem of the alteration of interface state concentration during operation is avoided.

Advantageously, the thickness of the second insulator layer is made sufficiently large such that, in the range of the relatively large voltages applied to the metal electrode in this invention, the tunneling probability is independent of thickness, at least in the range of electric field strengths in this second layer set up by these applied voltages. However, the thickness of the second insulator layer in the case of GaAs or GaP advantageously is limited by the prescription that the lateral resistance be of the order of $10^{10}$ ohms per square or more.

The operation of the semiconductor memory apparatus, according to this invention, may be briefly summarized. A signal voltage is applied to the $SI_1I_2M$ element described above. By reason of the tunneling of electrical charge carriers from (or to) the metal electrode in response to the signal, the interface between the two insulator layers either traps or untraps (discharges) these electrical charge carriers, depending upon the algebraic sign of the instantaneous value of the signal voltage. Continuous nondestructive readout of the memory state of the structure can be obtained by monitoring the $SI_1I_2M$ element with a capacitance detector, for example.

In an integrated circuit type of embodiment of this invention, the memory function is characterized by nondestructive readout. In this embodiment, the semiconductor serves as a substrate for an insulated gate field effect transistor (IGFET) in which the gate includes the two insulator layers and the metal electrode described above. Readout of the memory state is provided by monitoring the source-drain current of the field effect transistor.

Figure 2:
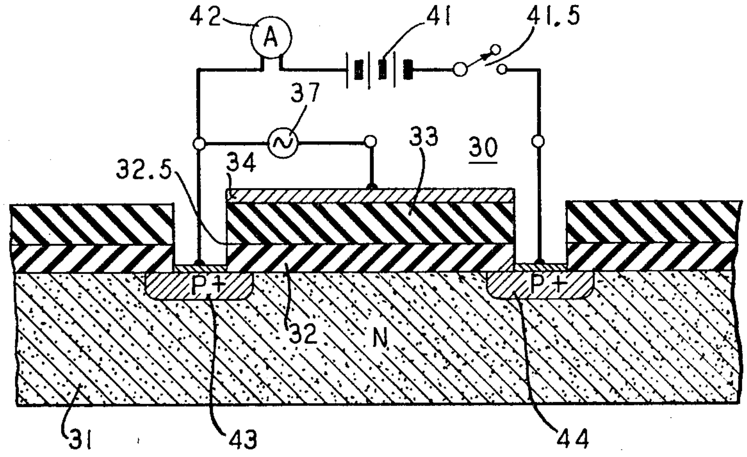

This invention, together with its advantages, features, and objects can be better understood from the following detailed description when read in conjunction with the diagram in which:

FIG. 1 is a diagram of a semiconductor memory apparatus according to a specific two terminal embodiment of this invention; and FIG. 2 is a diagram of a semiconductor memory apparatus according to a specific three terminal embodiment of this invention.

For the sake of clarity, none of the drawings is to scale.

As shown in FIG. 1, an N-type monocrystalline silicon wafer substrate 11, typically 5 to 10 mils thick, has a donor density of the order of $5\times10^{15}$ impurities per cubic centimeter. The wafer 11 serves as a substrate for a silicon oxide type of dielectric layer 12 having a thickness of the order of 500 A. The thickness of layer 12 is made this small in order to afford a relatively large electrical capacitance. Typically, the layer 12 is formed by oxidizing the cleaned silicon wafer 11 in dry oxygen, as known in the art, in order that the layer 12 be characterized by a high dielectric breakdown strength with a minimum of semiconductor surface states. A layer 13 of zinc sulfide, typically approximately 1,000 A thick, is in contact with the silicon oxide type layer 12, as shown in FIG. 1. The zinc sulfide layer 13 typically is deposited over the silicon oxide layer 12 at room temperature. A gold electrode 14, located on the top of the structure 10, and a chromium-gold alloy ohmic electrode 15, located on the bottom of the structure 10, complete the metal-insulator-insulator-semiconductor (MIIS) type capacitor structure 10. This structure 10 serves as a memory element in the circuit shown in FIG. 1.

To complete the circuit, the electrode 14 is connected by means of a wire lead 16 to a common terminal 17.5 of a single-pole double-throw switch 17. The other electrode 15 is connected by means of wire lead 18 to a common terminal 19. The positive side of a battery 20 and the negative side of a battery 21 are also connected to this common terminal 19. A first terminal 20.5 of the double-throw switch 17 is connected to the negative side of the battery 20, and a second terminal 21.5 of this switch 17 is connected to the positive side of the battery 21.

Typically, the voltages supplied by the batteries 20 and 21 are both of the order of 100 volts.

When the switch 17 is thrown into contact with a first terminal 20.5, the battery 20 causes electrons to tunnel from the electrode 14 through the zinc sulfide layer 13 to the interface 12.5 between the layers 12 and 13. Thus, the electrons which tunnel from the electrode 14 to the interface 12.5 are thereby trapped in the interface 12.5. These electrons remain trapped at the interface 12.5 so long as the switch 17 is not thrown into contact with the second terminal 21.5. However, if and when the switch 17 is thereafter thrown into contact with the terminal 21.5, thereby connecting the circuit including the structure 10 to the battery 21, then the trapped electrons are attracted toward and tunnel back to the electrode 14. This tunneling back gives rise to an instantaneous current discharge of the trapped charge at the interface 12.5, thus erasing the memory. It should be stressed that due to the fact that the barrier height at the interface 13.5 is smaller than the barrier height at the interface 11.5, no significant tunneling occurs through the insulator layer 12 between the interface 12.5 and the semiconductor 11.

On the other hand, continuous readout of the state of the trapped charge at the interface 12.5 is obtained by means of a conventional capacitance monitor circuit, typically including a signal source 23 and a current detector 22, connected to the common terminal 17.5 of the switch 17 and the common terminal 19. Since the capacitance of the structure 10 depends upon the state of the trapped charge, the current sensed by the detector 22 also depends upon the state of the trapped charge at the interface 12.5. Thus, the detector 22 furnishes the desired continuous readout of the state of trapped charges at the interface 12.5 in the memory element formed by the structure 10 in the circuit shown in FIG. 1. Thus, the circuit shown in FIG. 1, in combination with the structure 10 therein, provides a memory with continuous and nondestructive readout.

FIG. 2 illustrates a circuit including a structure 30 which is similar to the structure 10; but the structure 30 is in an integrated type circuit arrangement, including an FET (field effect transistor) portion thereof serving as a readout device. An N-type monocrystalline silicon semiconductor wafer substrate 31 supports a silicon oxide type layer 32 upon which is located a zinc sulfide layer 33. The layers 32 and 33 are substantially identical to the layers 12 and 13 previously described in connection with FIG. 1. In particular, the zinc sulfide layer 33 is sufficiently thin to allow tunneling therethrough with the operating gate voltages; whereas the silicon oxide layer 32 is sufficiently thin to provide a structure with a sufficiently large capacitance, and hence to provide a sufficiently large detectable amount of trapped charge at the interface 32.5 for a given applied voltage. The substrate 31 is substantially identical to the previously described substrate 11 except that the substrate 31 also contains a source region 43 and a drain region 44. These regions 43 and 44 are strongly P-type ($P^+$) conductivity silicon by reason of diffusion of acceptor impurities into the original silicon substrate, as known in the art of field effect transistors.

A signal source 37 connects the source region 43 to the gate electrode 34, as shown in FIG. 2, in order to apply signal to the structure 30. This signal source 37 provides both positive and negative pulses, typically from about 20 to about 100 volts for a time period of the order of microseconds or more each pulse. These signals are applied by the source 37 to the gate electrode 34 in order to activate or erase the electrical charges tunneling to and from the interface 32.5. A battery 41, a switch 41.5 and a current detector 42 are electrically connected serially to the source region 43 and to the drain region 44, in order to complete the circuit shown in FIG. 2.

The closing of the switch 41.5 enables continuous and nondestructive readout by the galvanometer 42 of the state of the trapped charge at the interface 32.5 produced by the signal source 37. The signal supplied by the source 37 to the gate electrode 34 causes tunneling of electrons both from the electrode 34 to the interface 32.5, and from this interface back to this electrode, depending upon the algebraic sign of the signal. Advantageously, the signal source 37 furnishes both negative and positive pulse type of signals; in order to increase and decrease, respectively, the trapped charge at the interface 32.5 in a binary fashion.

It should be appreciated that the circuit containing the structure 30 shown in FIG. 2 thus affords a memory with nondestructive readout, i.e., the memory of the previous voltage pulse sequence applied by the signal source 37 to the electrode 34. In addition, the structure 30 has the added feature of the transistor action of the field effect type (FET) furnished by the source and drain regions 43 and 44 in conjunction with an "inversion layer" ("Channel") therebetween formed at the top major surface of the N-type semiconductor substrate 31.

Although this invention has been described in detail in terms of the particular semiconductor material silicon in combination with a silicon dioxide-zinc sulfide insulator layer, it is obvious that other semiconductor and insulator materials can be used in this invention provided they satisfy relative tunnelability usually associated with the barrier height relationship discussed above. It is also obvious that many memory elements, each of the type described above, can be combined in a memory array on a single semiconductive substrate.

What is claimed is:

1. A memory apparatus which comprises:

a. a silicon semiconductor-insulator$_1$- insulator$_2$-metal layer structure in which the energy barrier height between the insulator$_2$ layer and the metal layer in physical contact therewith is less than the energy barrier height between the insulator$_1$ layer and the silicon semiconductor, so that tunneling of electrical charge carriers from the metal through the insulator$_2$ layer to the interface between the insulator$_1$ and insulator$_2$ layers in response to an applied voltage occurs with a probability at least an order of magnitude greater than tunneling of electrical charge carriers from the said interface through the insulator$_1$ layer to the semiconductor, the first layer being essentially silicon dioxide more than about 500 A. thick and the second layer being zinc sulfide;

b. means for applying a signal voltage between the semiconductor and the metal layer sufficient to produce tunneling of charge carriers from the metal to the interface and thereby to produce trapped charges at the interface which persist after the signal voltage has been removed;

c. means for monitoring the presence of the trapped charges at the interface.

2. The memory apparatus recited in claim 1 in which the semiconductor includes first and second regions having a conductivity type opposite from at least the portion of the semiconductor upon which the insultator$_1$ layer is in physical contact, and a first and a second electrode in physical contact with the first and the second regions, respectively, thereby forming a field effect transistor in which the first and second electrodes from the source and drain electrodes and the metal layer forms the gate electrode.

3. The memory element of claim 1 in which the second layer is approximately 1,000 A. thick and the first layer is about 500 A. thick.

4. The memory element of claim 1 in which the second layer is approximately 1,000 A. thick and the first layer is about 500 A. thick.

5. The memory element of claim 1 in which the first layer is of a material taken from the group consisting of silicon oxide, zirconium oxide, and aluminum oxide.

UNITED STATES PATENT OFFICE
CERTIFICATE OF CORRECTION

Patent No. 3,604,988 Dated September 14, 1971

Inventor(s) Dawon Kahng and Edward H. Nicollian

It is certified that error appears in the above-identified patent and that said Letters Patent are hereby corrected as shown below:

Column 4, line 59, after "A. thick" insert a period, and cancel "and the first layer is about 500". Column 4, line 60, cancel "A. thick.".

Signed and sealed this 4th day of April 1972.

(SEAL)
Attest:

EDWARD M.FLETCHER,JR.
Attesting Officer

ROBERT GOTTSCHALK
Commissioner of Patents